(12) United States Patent
Gabrysch et al.

(10) Patent No.: US 9,533,659 B2
(45) Date of Patent: Jan. 3, 2017

(54) TOWING DEVICE FOR MOTOR VEHICLES

(71) Applicant: arwe Holding GmbH, Munich-Flughafen (DE)

(72) Inventors: David Gabrysch, Duesseldorf (DE); Donald Peschla, Ulm (DE)

(73) Assignee: ARWE HOLDING GMBH, München-Flughafen (DE)

( * ) Notice: Subject to any disclaimer, the term of this patent is extended or adjusted under 35 U.S.C. 154(b) by 0 days.

(21) Appl. No.: 14/762,127

(22) PCT Filed: Nov. 18, 2013

(86) PCT No.: PCT/EP2013/074027
§ 371 (c)(1),
(2) Date: Jul. 20, 2015

(87) PCT Pub. No.: WO2014/111181
PCT Pub. Date: Jul. 24, 2014

(65) Prior Publication Data
US 2015/0353059 A1 Dec. 10, 2015

(30) Foreign Application Priority Data

Jan. 21, 2013 (EP) ..................................... 13152088

(51) Int. Cl.
*B60S 3/00* (2006.01)
*B65G 19/02* (2006.01)
*B65G 39/20* (2006.01)

(52) U.S. Cl.
CPC ............... *B60S 3/004* (2013.01); *B65G 19/02* (2013.01); *B65G 39/20* (2013.01); *B65G 2201/0294* (2013.01)

(58) Field of Classification Search
CPC .......... B60S 3/004; B65G 19/02; B65G 39/20; B65G 2201/0294
See application file for complete search history.

(56) References Cited

U.S. PATENT DOCUMENTS 3,196,806 A * 7/1965 Brunder .................. B60S 3/004
104/172.3
3,233,557 A * 2/1966 Rickel ..................... B60S 3/004
104/172.3

(Continued)

FOREIGN PATENT DOCUMENTS

DE 20104463 U1 7/2002
EP 1241116 A1 9/2002
WO WO-2012-057415 A1 5/2012

*Primary Examiner* — Gene Crawford
*Assistant Examiner* — Keith R Campbell
(74) *Attorney, Agent, or Firm* — Harness, Dickey & Pierce, P.L.C.

(57) ABSTRACT

A towing device for motor vehicles includes a conveyor chain revolving between a first deflecting device including a first axis of rotation and a second deflecting device including a second axis of rotation, wherein the conveyor chain comprises a chain forward strand along a load strand and a chain return strand along an empty strand; a conveying path for motor vehicles at least partially disposed along the load strand; at least one driver for a motor vehicle tire, wherein the driver is connected to an associated chain joint disposed at the conveyor chain and serves for towing a motor vehicle along the conveying path; and a circumferential guide track for guiding the at least one driver. The first and the second axis of rotation are arranged vertically. The load strand and the empty strand of the conveyor chain are arranged in a horizontal plane.

9 Claims, 20 Drawing Sheets

(56) References Cited

U.S. PATENT DOCUMENTS

| | | | | |
|---|---|---|---|---|
| 3,526,193 | A | * | 9/1970 | Vani ........................ B60S 3/004 104/172.3 |
| 3,719,151 | A | * | 3/1973 | Andersen .............. B61B 10/046 104/172.3 |
| 3,744,433 | A | * | 7/1973 | Bernardi ............... B61B 10/046 104/172.3 |
| 3,789,766 | A | | 2/1974 | Hurwitz |
| 3,815,512 | A | * | 6/1974 | Balas .................... B61B 10/046 104/172.3 |
| 3,971,325 | A | * | 7/1976 | Evans .................... B65G 19/02 104/172.3 |
| 5,228,392 | A | * | 7/1993 | Belanger ................ B65G 19/02 104/162 |
| 5,443,014 | A | | 8/1995 | Belanger et al. |
| 7,117,989 | B2 | * | 10/2006 | Weigel .................. B65G 23/44 198/502.1 |

* cited by examiner

TOWING DEVICE FOR MOTOR VEHICLES

CROSS-REFERENCE TO RELATED APPLICATIONS

This application is a National Stage of International Application No. PCT/EP2013/074027, filed on Nov. 18, 2013, and published in German as WO 2014/111181 A1 on Jul. 24, 2014. This application claims the benefit and priority of European Application No. 13152088.4, filed on Jan. 21, 2013. The entire disclosures of the above applications are incorporated herein by reference.

BACKGROUND

This section provides background information related to the present disclosure which is not necessarily prior art.

TECHNICAL FIELD

The disclosure relates to a towing device for motor vehicles, in particular in a washing plant.

DISCUSSION

Such towing devices are typically used to advance motor vehicles with a pre-defined speed through a washing plant. Herein, such towing devices comprise two parallel chains with drivers fixed there between, wherein the drivers disposed between the chains can engage behind a vehicle wheel of a motor vehicle, such that the vehicle can be moved forward via the vehicle wheel along a conveying path while the chain is revolving. Towing of the vehicle is carried out regularly in a load strand of the chains. A return of the chains and the drivers can be effected in an empty strand of the chains, wherein the empty strand is arranged below the load strand of the chains. The drivers for towing the motor vehicle are fixedly arranged at predetermined intervals between the two chains.

SUMMARY OF THE DISCLOSURE

It is an object of the disclosure to provide a towing device of the type mentioned above which allows a more cost-effective assembly and a reduction in the maintenance and repair costs.

This object is achieved by the features of the teachings of the present disclosure. Advantageous embodiments are disclosed in the following description.

A towing device for motor vehicles according to the disclosure, especially for a washing plant, comprises: a conveyor chain revolving between a first deflecting device having a first axis of rotation and a second deflecting device having a second axis of rotation, wherein the conveyor chain has a chain forward strand along a load strand and a chain return strand along an empty strand, a conveying path for motor vehicles at least partially arranged along the load strand, at least one driver connected to an associated chain joint which is arranged at the conveyor chain for a motor vehicle tire for towing a motor vehicle along the conveying path, and a revolving guide track for guiding said at least one driver. According to the disclosure the first and the second axis of rotation are arranged vertically, wherein the load strand and the empty strand of the conveyor chain are arranged in a horizontal plane.

By means of the towing device a motor vehicle can be towed through a washing plant by use of an adjustably driven conveyor chain by means of a driver which engages at a motor vehicle tire. Herein, the conveyor chain can be arranged horizontally revolving between a first deflecting device having a first axis of rotation and a second deflecting device having a second axis of rotation. Herein, a chain forward strand is arranged along a load strand of the conveyor chain, and a chain return strand is arranged along an empty strand of the conveyor chain. Along at least a portion of the load strand a conveying path for towing one or more motor vehicles is arranged along which the motor vehicles can be towed in a conveying direction by means of drivers, which can engage at a vehicle tire of the respective motor vehicle. The first deflecting device can deflect the conveyor chain from the empty strand to the load strand horizontally to a floor on which the towing device may be mounted overfloor. The second deflecting device can deflect the conveyor chain horizontally from the load strand to the empty strand, e.g. at the end of the conveying path. The conveyor chain can be configured in the form of a bush conveyor chain, wherein the chain links may be connected by rivets. The horizontally revolving conveyor chain can be arranged so that the bolts for connecting the individual chain links of the conveyor chain and/or of chain joints are arranged perpendicular to the floor.

The first deflecting device can be configured in the form of a deflecting station with a chain tensioner and the second deflecting device can be configured in the form of a drive station, for example, comprising an adjustable electric drive which may comprise a transmission. A driver for a motor vehicle tire for towing a motor vehicle along the conveying path can respectively be connected to the conveyor chain by means of chain joint arranged on the conveyor chain. Here, the driver can be arranged horizontally tiltable and pivotable at the respective chain joint by means of a bolt. The chain joint can be disposed at the outer side of the conveyor chain or may be integrated into the conveyor chain in the form of a chain link, for example, by rivets. The driver can be disposed at the outer side of the conveyor chain, wherein the driver may comprise a driver roller for contacting and driving a motor vehicle tire, wherein the driver roller can be rotatably mounted about a driver axis. The driver axis can be disposed perpendicular to the first axis of rotation and the second axis of rotation. The driver can comprise a first track roller and a second track roller rotatably mounted about the driver axis, wherein the first and the second track roller may be disposed on either side of the driver roller. The diameter of the driver roller may be smaller than the diameter of the first and the second track roller, wherein said driver roller can be rotatably mounted about the driver axis independently of the first and the second track roller. The first and the second track roller can be arranged on both sides of a motor vehicle tire during towing and contacting a motor vehicle tire. For guiding the driver the towing device can comprise a revolving guide track, wherein the driver can comprise a first and a second guide roller for contacting the guide track. Here, the first guide roller can contact the guide track at the outer side, at a side of the guide track facing away from the conveyor chain, in particular in the area of the conveying path and/or the chain return strand. The second guide roller can contact the guide track at the inner side at a side of the guide track facing the conveyor chain, in particular in the area of the conveying path and/or the chain return strand. The second guide roller can be arranged in front of the first guide roller in the conveying direction of the conveyor chain, wherein the first guide roller serves for supporting the force required for towing the motor vehicle on the guide track. The first and the second guide roller can have different diameters and/or different thicknesses, in particular, the second guide roller, which can engage at the inner side of the track, can be configured flatter than the first guide roller. Here, the second guide roller can contact the guide track at the inner side in an upper region spaced apart from the floor. By means of the guide track the driver, for example at the end of the conveying path, can be pivoted in a horizontal plane and thus become disengaged from the motor vehicle tire. After having disengaged from the motor vehicle tire, the driver can be transferred from the conveying path and the load strand into the chain return strand and the empty strand by a horizontal pivoting movement about the second axis of rotation. A horizontal pivoting movement means a pivoting movement in a horizontal plane, which is formed substantially parallel to the floor. The driver axis can be pivoted in the same horizontal plane during the pivoting movement at the first deflecting device and the second deflecting device about the first and the second axis of rotation.

By means of the vertical arrangement of the first and the second axis of rotation perpendicular to the floor on which the towing device can be arranged overfloor, a horizontal transfer of the driver from the load strand to the empty strand is enabled, wherein the load strand and the empty strand of the conveyor chain can also be arranged side by side in a horizontal plane. Thus the chain forward strand and the chain return strand can also be arranged side by side in the same horizontal plane. This allows to mount the towing device overfloor on a floor which in particular requires no recess, wherein no cost intensive recesses have to be provided for the chain return strand and wherein the towing device in particular with the empty strand of the conveyor chain is not formed underfloor and at least partially extends into the floor. The overfloor configuration of the towing device enables a cost-effective installation directly on the existing floor, wherein the very small overfloor setup of the towing device allows for easy access to components of the towing device and also easy cleaning of the towing device. In addition, due to the small overfloor setup of the towing device the usable storey height can substantially fully be used for a given storey height. In addition, the easy accessibility of the towing device enables simplified maintenance and repair such that maintenance and repair costs can be reduced.

DETAILED DESCRIPTION OF THE PREFERRED EMBODIMENTS

In a preferred embodiment the guide track comprises a profile formed in a perpendicular direction. The profile of the guide track can be formed in the area of the second deflecting device in particular the drive station at the guide track. Herein, the profile can extend from one end of the conveyor path up to a start of the chain return strand and can extend substantially over an angle of 180° about the second axis of rotation. By means of the profile the vertical extent, the height, of the guide track along a portion of the guide track over the floor can be changed. The profile can, for example, be configured in the form of a step, wherein coming from the conveying path and the chain forward strand the height of the guide track can be reduced by one step and at the start of the chain return strand the height of the guide track can be increased again by one step, for example, to the previous height. By means of the profile, in particular by changing the height of the guide track in the region of the second deflecting device, a guide roller, in particular the second guide roller of the driver can be moved without contact with the guide track, and can be deflected beyond the guide track in the region of the second deflecting device. This enables a tilting movement and a pivoting movement of the driver in a horizontal plane opposite to the moving direction of the conveyor chain. The tilting movement of the driver in the horizontal plane opposite to the moving direction of the conveyor chain can cause a disengagement of the driver from the motor vehicle wheel moving continuously, whereby a lateral inwardly retracting movement of the driver is enabled and the driver can be pivoted horizontally from the chain forward strand to the chain return strand without any force. At the start of the chain return strand the guide roller, in particular the second guide roller, can again engage at the inner side of the track, whereby a guide of the driver along the chain return strand can be ensured.

In a particularly preferred embodiment the driver comprises at least one support roller. The driver may comprise a first and a second track roller which can be rotatably mounted around a driver axis, wherein the first and the second track roller can be positioned on either side of a driver roller for contacting a motor vehicle tire. The at least one support roller can be rotatably mounted around a support roller axis, wherein the driver axis and the support roller axis can be arranged parallel to each other and spaced apart from each other. A plurality of support rollers may be arranged on the support roller axis and/or may each have own axes. The support roller axis can be arranged at a side of the driver axis facing away from the motor vehicle tire. By means of the support roller the driver can be supported in a horizontal position, whereby a contact of the driver, in particular the first guide roller, with the floor can be avoided. Thus, wear of the guide rollers can be reduced. In addition, the support roller is adapted to avoid torsion of chain joint.

Particularly preferably the chain joint comprises a bolt for the pivotably mounting the driver and the driver comprises a corresponding bore for receiving the bolt. The chain joint comprises on the outer side a bolt for pivotably mounting the driver, wherein the driver may be mounted rotatably within a corresponding bore of the driver. The bolt may be removably mounted at the outer side of the chain joint. The bore for receiving the bolt at the driver may be disposed between the driver axis and the support roller axis, wherein the bore may in particular be disposed behind the second guide roller when viewed in the conveying direction. By disposing the bolt at the chain joint the construction of the bolt-free driver can be simplified. In addition, a replacement of a driver can be simplified.

In a particularly preferred embodiment the first and/or the second deflecting device comprises a driver plate for vertically supporting the driver. The driver plate can be configured in the form of a disc and be arranged rotatably about the first and/or the second axis of rotation, for example, below the conveyor chain. During the pivoting movement of a driver, for example, from the load strand to the empty strand the driver plate may be contacted by the driver, such that the driver can be supported in the vertical direction. Thus, a deflection of the driver about the first and/or the second axis of rotation is enabled without contact to the floor, such that wear of the driver can be reduced.

Particularly preferably the first deflecting device comprises a hydraulic chain tensioner. The first deflecting device can be configured in the form of a deflecting station in order to allow a deflection of the driver from the chain return strand to the chain forward strand with less friction. Herein, the hydraulic chain tensioner of the deflecting device can be configured in the form of a pressure-controlled hydraulic cylinder. This can avoid a manual tensioning of the conveyor chain, and a constant optimal tension of the conveyor chain can be ensured.

Preferably, the conveying path comprises a track for motor vehicle wheels and/or a rim protector. The conveying path may include a track for motor vehicle tires of a motor vehicle. Herein, the track can be constructed in the form of a plate or a profile, wherein the profile can have one or two collars. A track with two collars may be configured in the shape of a trough, which may comprise a collar at the inner and at the outer side. The conveying path may comprise a rim protector for protecting a rim of a motor vehicle tire during the towing of the motor vehicle along the conveying path. The rim protector can be arranged along at least a portion of the conveying path. The rim protector can be arranged on the inner side at a side of the motor vehicle tire facing the conveyor chain and/or at the outer side at a side of the motor vehicle tire facing away from the conveyor chain. The rim protector can be made from a material having a smooth surface and/or a low coefficient of friction, whereby scratching of the rim can be avoided.

It is preferably provided that the rim protector is configured in the form of protective rollers. The protective rollers may have an elongated extension and be mounted rotationally about a roll axis. Herein, the roll axis can be arranged substantially parallel to the conveying path and/or the load strand of the conveyor chain. The protective rollers may be arranged at the conveying path, at the track and/or at a cover of the towing device. The roll axes of the protective rollers may respectively be arranged substantially coaxially at the outer and/or inner side of the motor vehicle tire. By means of a contact of the rolling motor vehicle tire with the protective roller, in particular a contact of the motor vehicle rim with the protective roller, the protective role can yield by rotating around the roll axis, such that a damage of the rim by a reduced relative movement between the protective roller and the motor vehicle tire, in particular the rim, can be avoided. A protective roller may be configured from a material having a low friction coefficient and/or a smooth surface, for example from a plastic material such as Teflon.

More preferably, tracks are provided for the first and the second track roller and/or the support roller of the driver along the chain return strand. The tracks for the first and the second track roller and/or the support roller of the driver may be mounted overfloor in the form of strips on the floor and extend substantially parallel to the conveyor chain along the empty strand and the chain return strand. By means of the tracks the rolling resistance of the drivers can be reduced in the chain return strand. In addition, wear and possible damage to the driver can be avoided.

Furthermore, a washing plant comprising at least one towing device configured as described above is claimed.

BRIEF DESCRIPTION OF THE DRAWINGS

The drawings described herein are for illustrative purposes only of selected embodiments and not all possible implementations, and are not intended to limit the scope of the present disclosure.

Hereinafter the disclosure will be explained in more detail with reference to the accompanying drawings on the basis of a preferred embodiment.

In the drawings:

FIG. 1 shows a perspective view of a towing device;

FIG. 2 shows a perspective view of a portion of the towing device including a conveying path;

FIG. 3 shows a perspective view of a second deflecting device in the form of a drive station;

FIG. 4 shows a schematic representation of a first deflecting device;

FIG. 5 shows a perspective view of a chain joint including a bolt;

FIG. 6 shows a perspective view of a driver comprising a first and a second track roller;

FIG. 7 shows a plan view of a driver comprising a support roller;

FIG. 8 shows a side view of the driver shown in FIG. 7;

FIG. 9 shows a perspective view of the driver shown in FIG. 7;

FIG. 10 shows a perspective view of the driver shown in FIG. 7 provided at a chain joint;

FIG. 11 shows a side view of the second deflecting device with a conveying path and a chain return strand;

Figure 11:
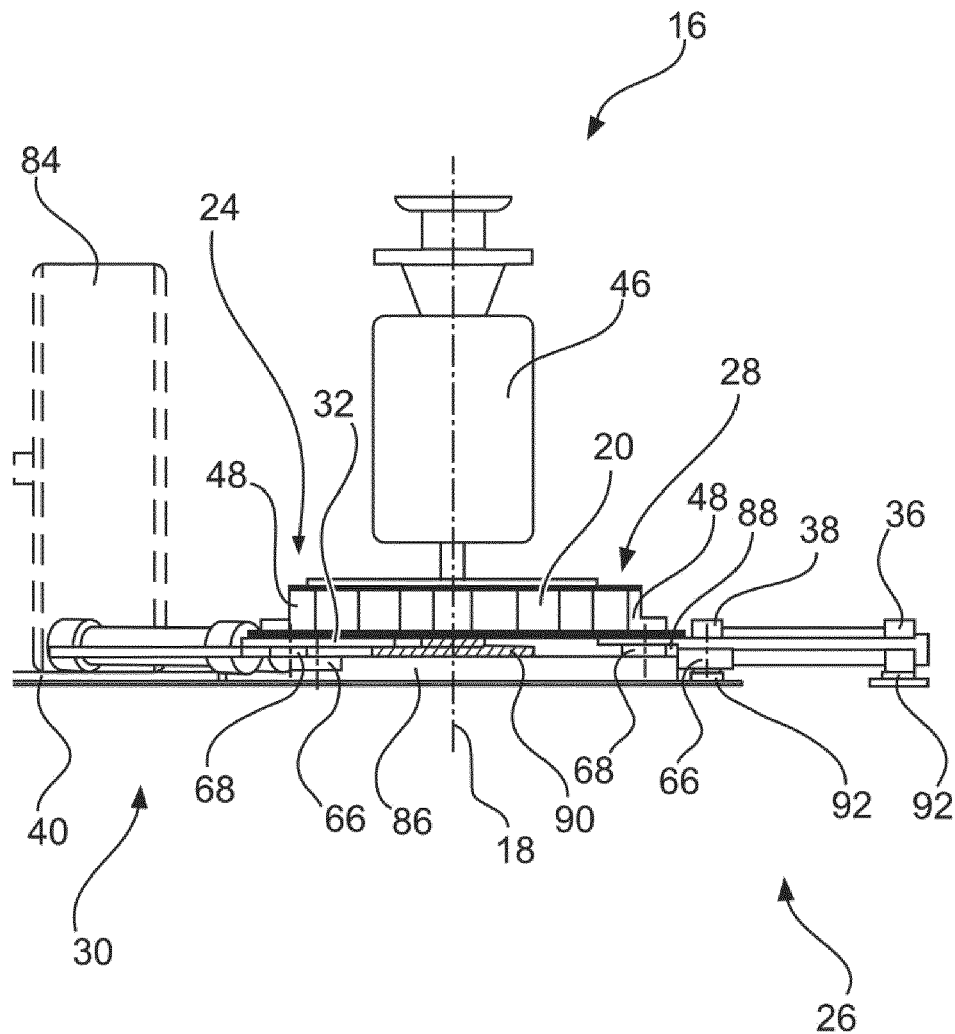
Figure 12:
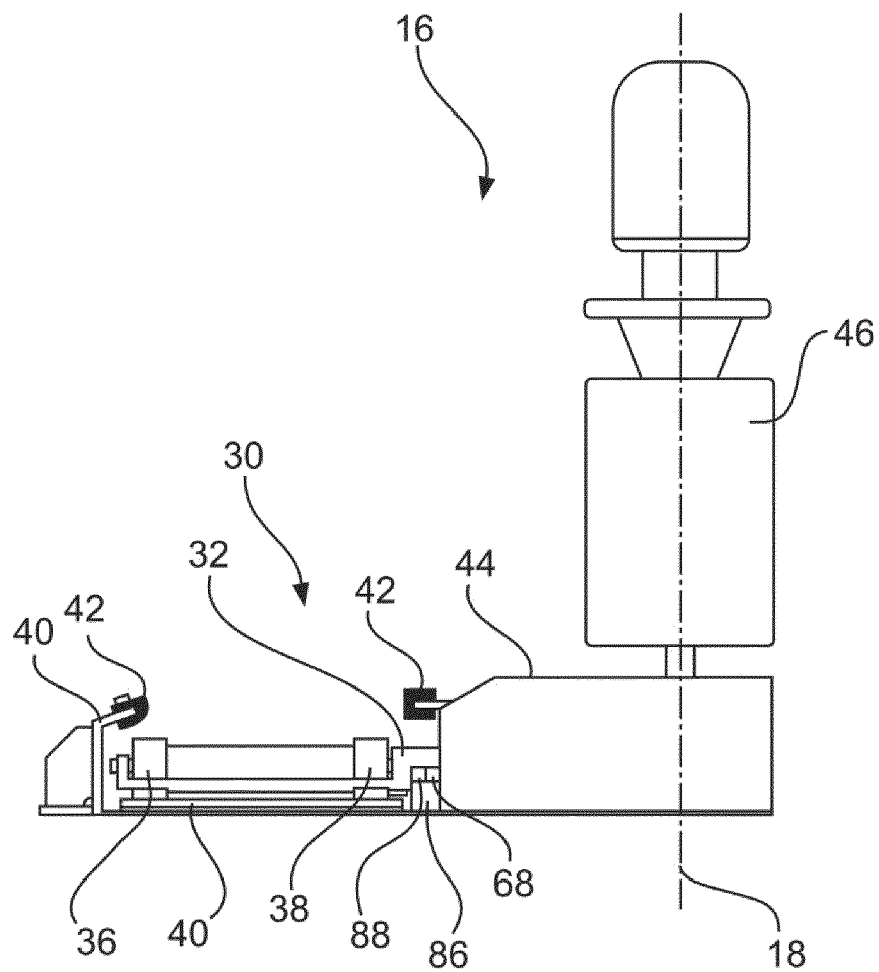
Figure 13:
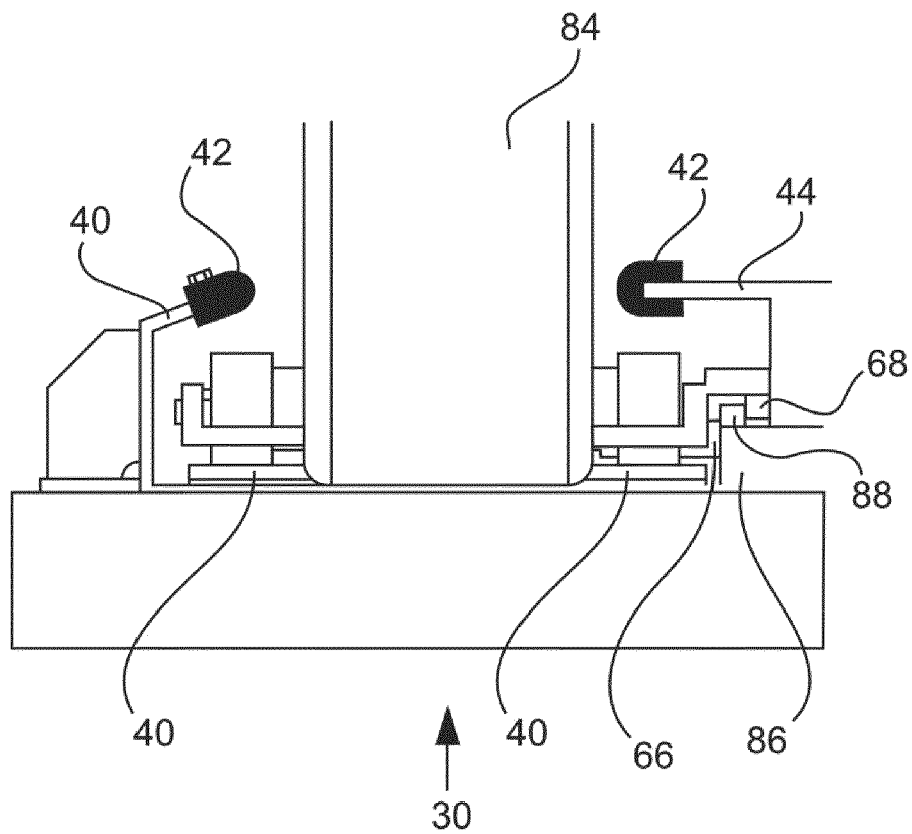
Figure 14:
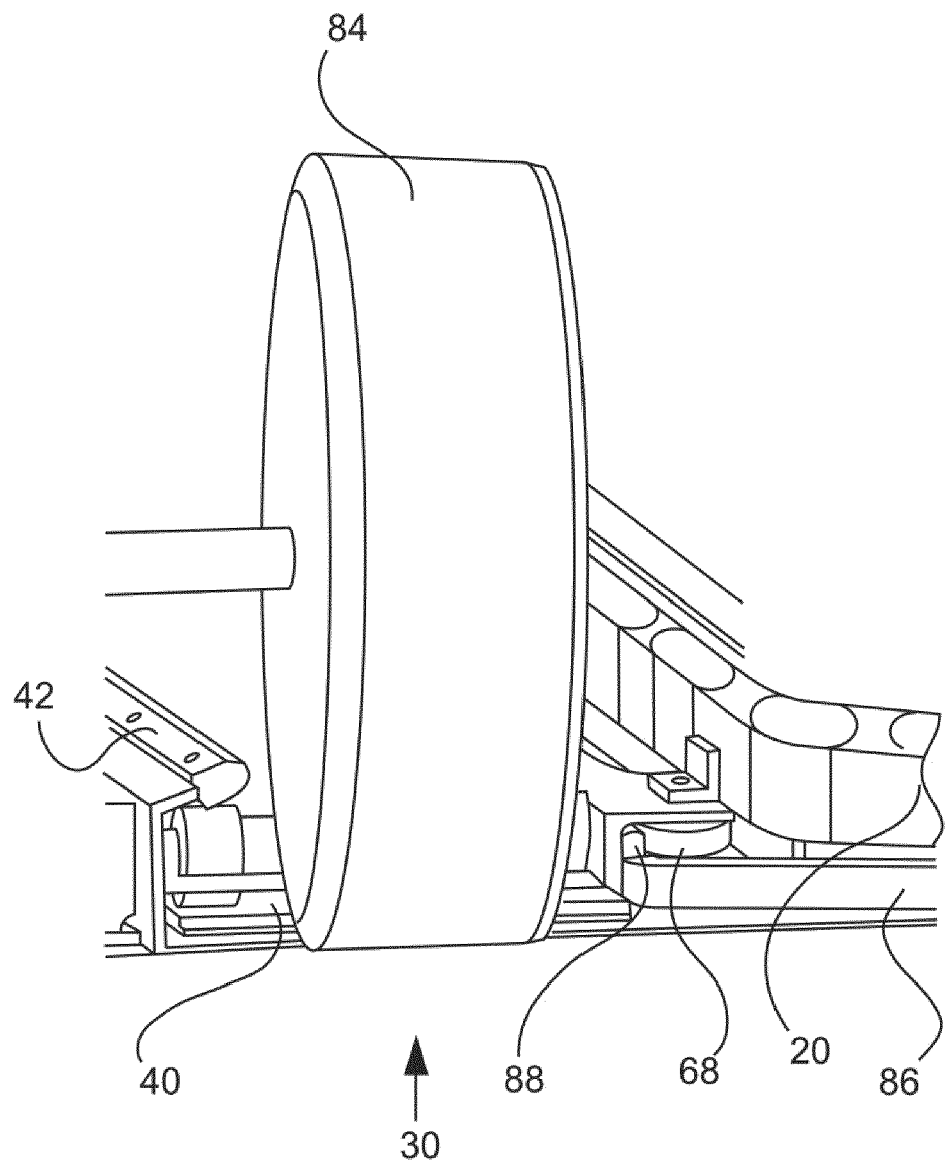
Figure 15A:
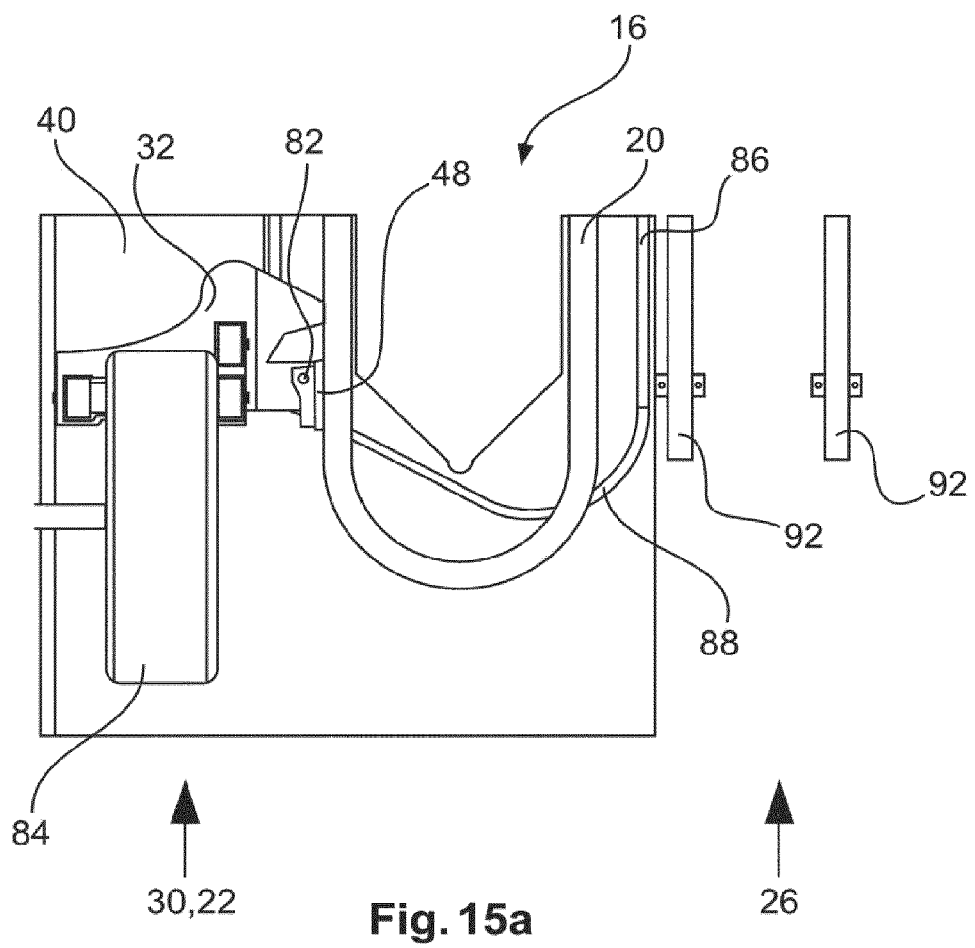
Figure 15B:
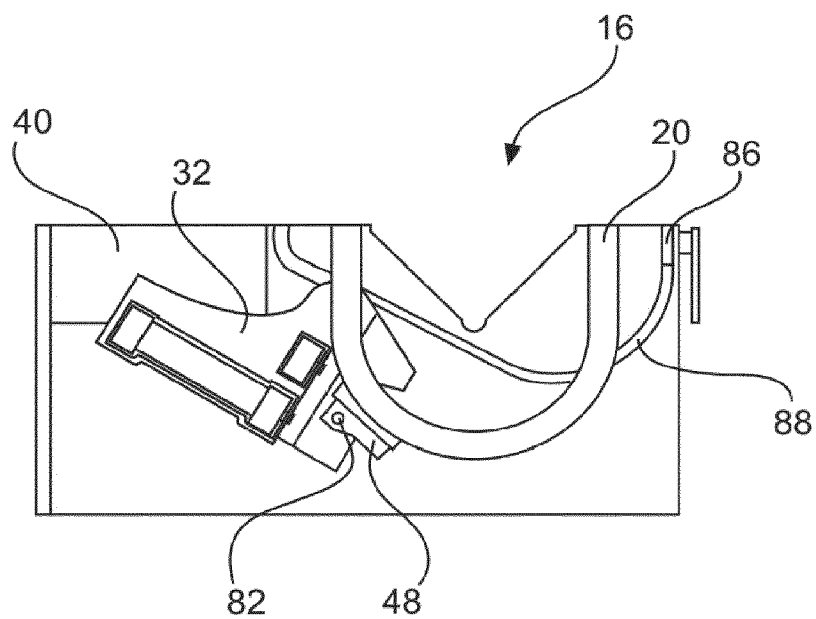
Figure 15C:
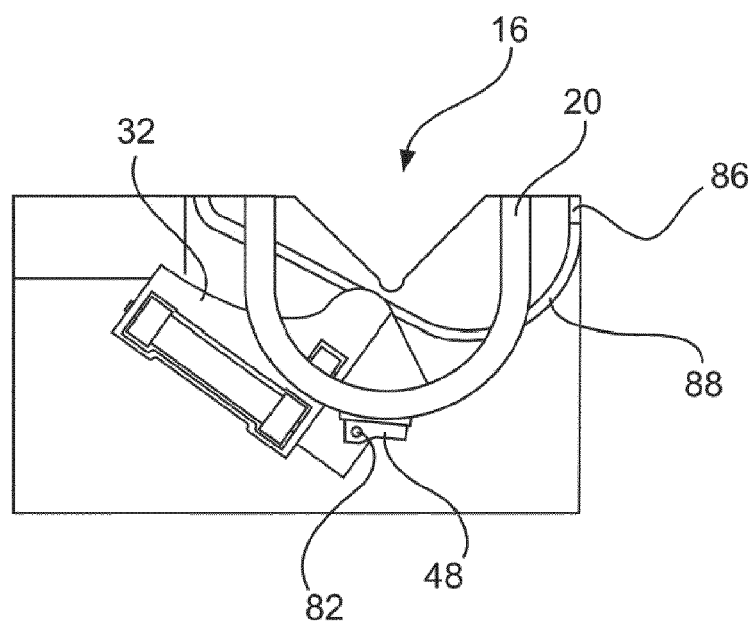
Figure 15D:
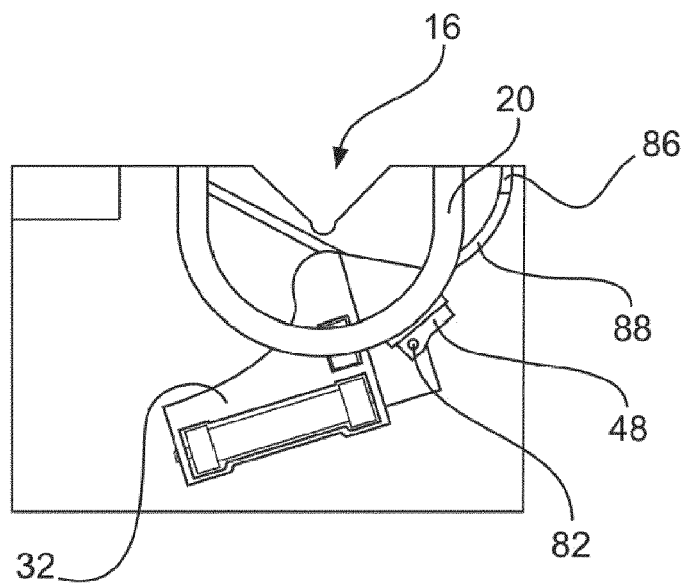
Figure 15E:
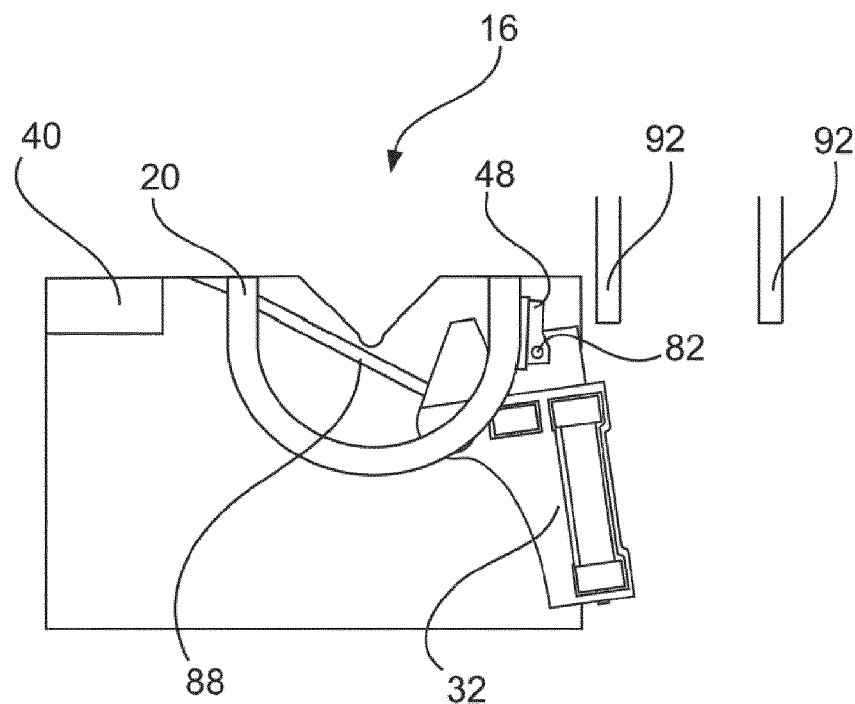
Figure 15F:
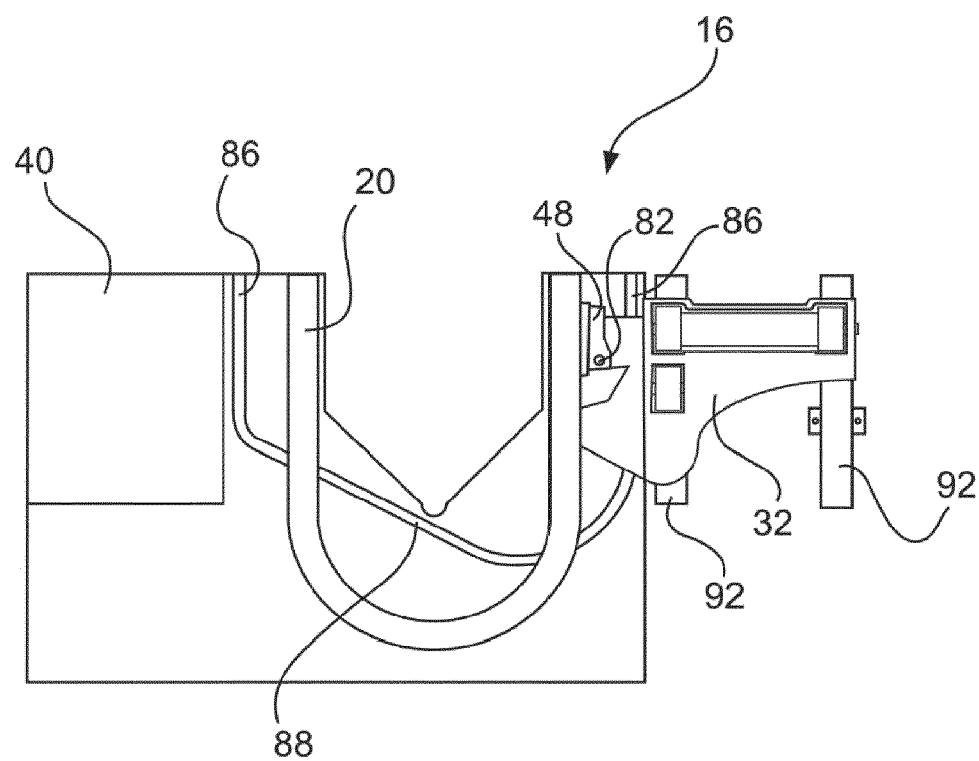
Figure 16:
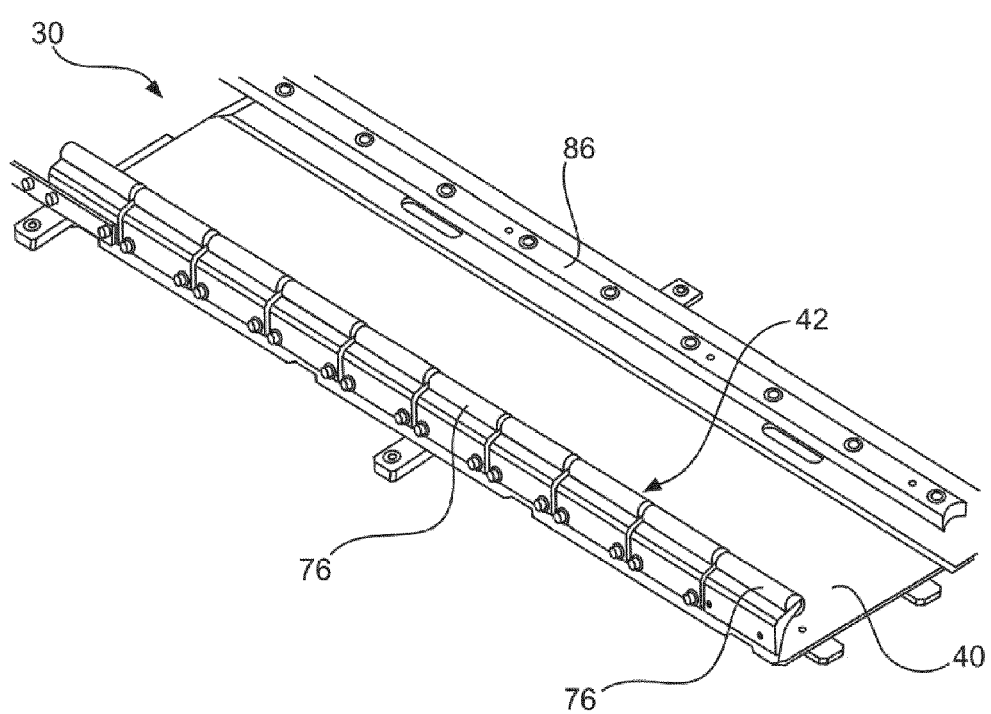
Figure 17:
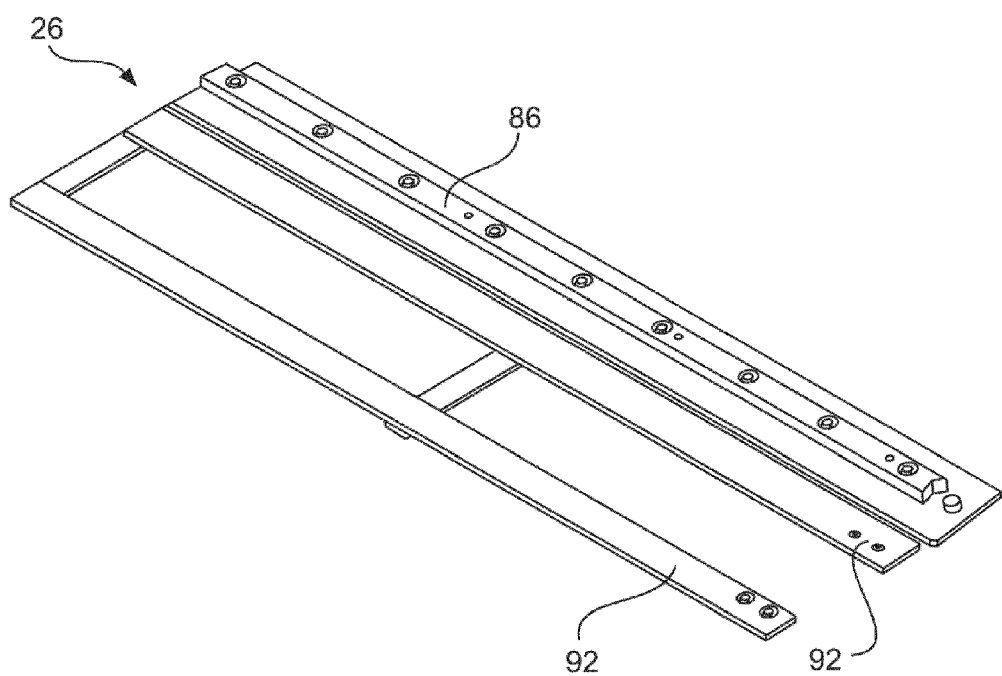
Figure 18:
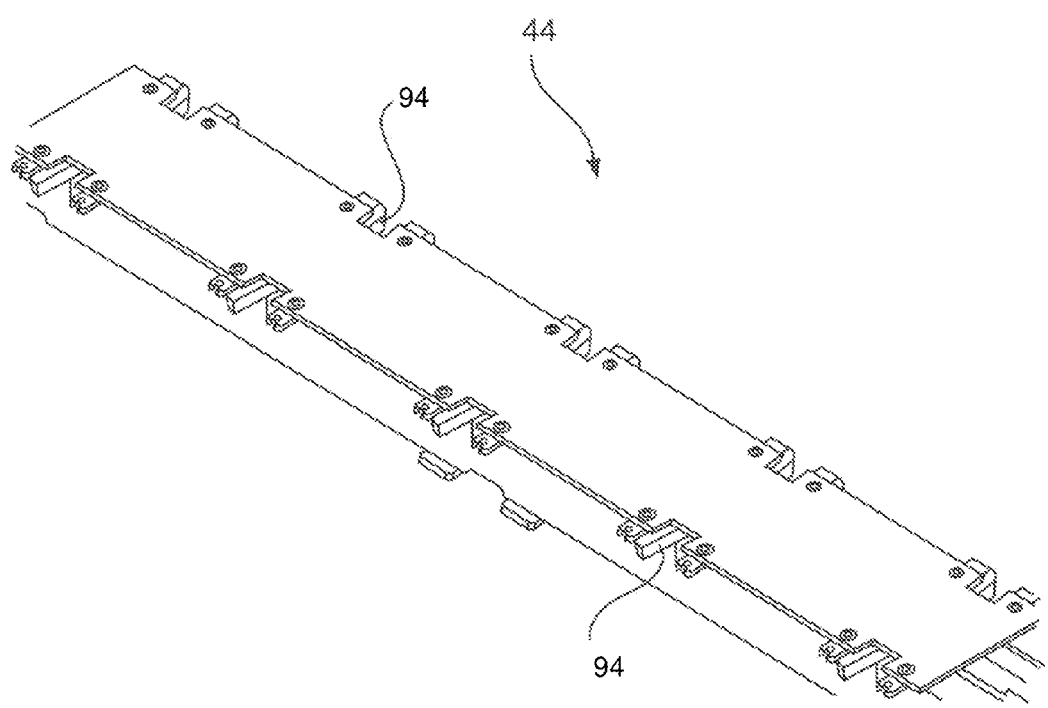
Figure 19:
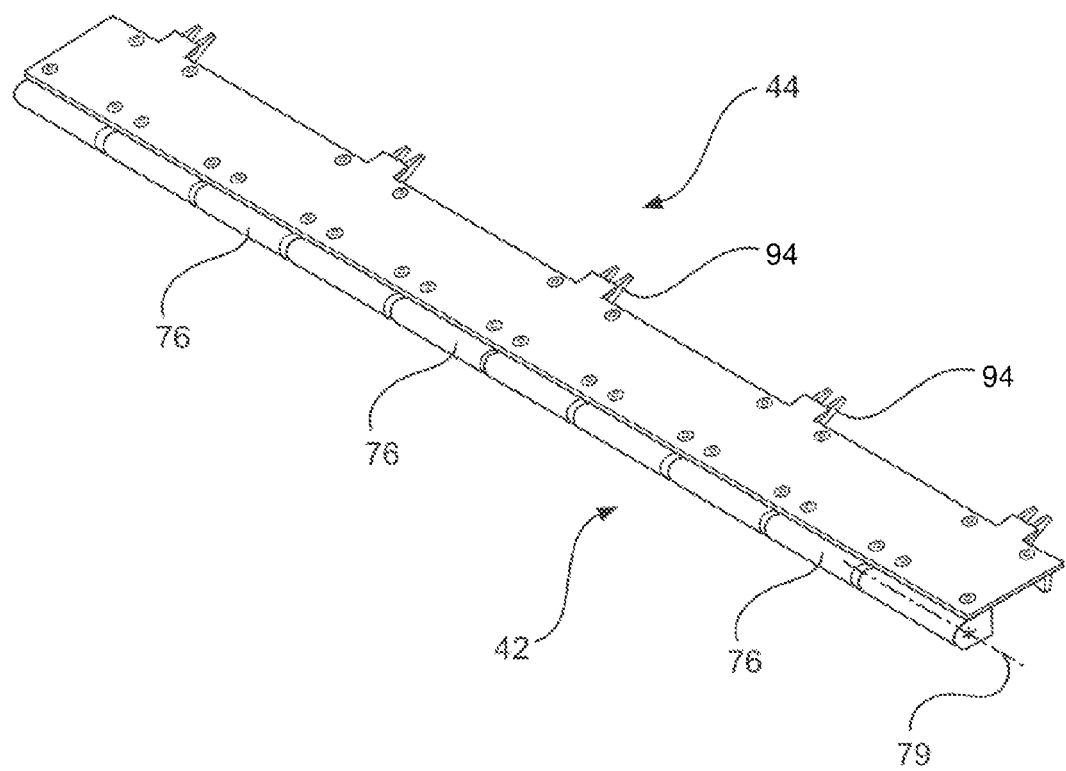
Figure 20:
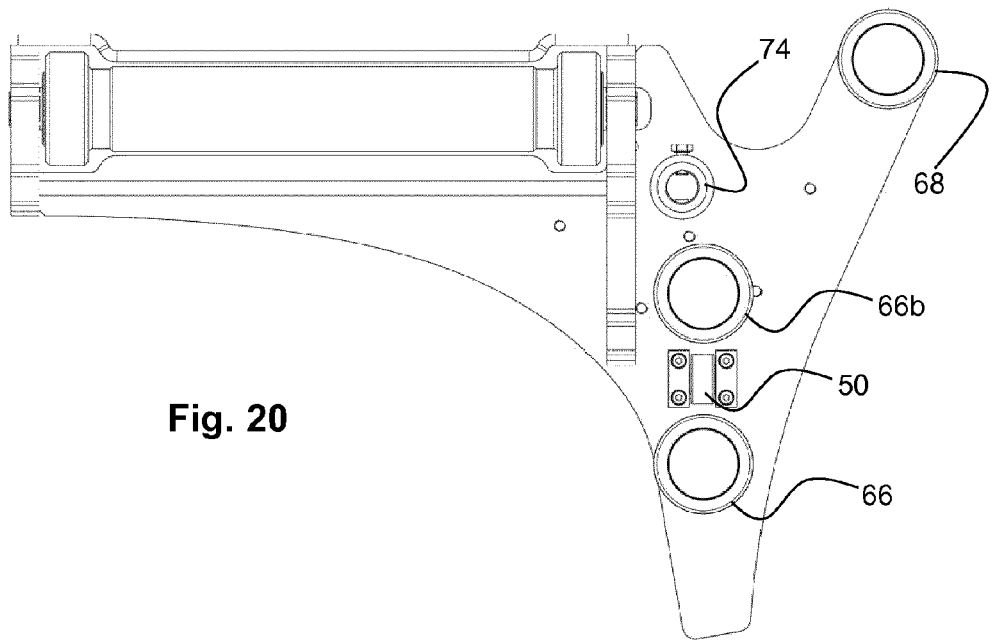

FIG. 12 shows a portion of the second deflecting device shown in FIG. 11;

FIG. 13 shows a portion of the second deflecting device shown in FIG. 12 including a motor vehicle tire;

FIG. 14 shows a perspective view of the second deflecting device shown in FIG. 13;

FIGS. 15a-f show a plan view of the second deflecting device including a pivoted drive;

FIG. 16 shows a portion of a conveying path including a track;

FIG. 17 shows a perspective view of tracks of the chain return strand;

FIG. 18 shows a perspective view of a cover of the towing device;

FIG. 19 shows a perspective view of a cover of the conveying path;

FIG. 20 shows a plan view of a further embodiment of a driver; and

Figure 21:
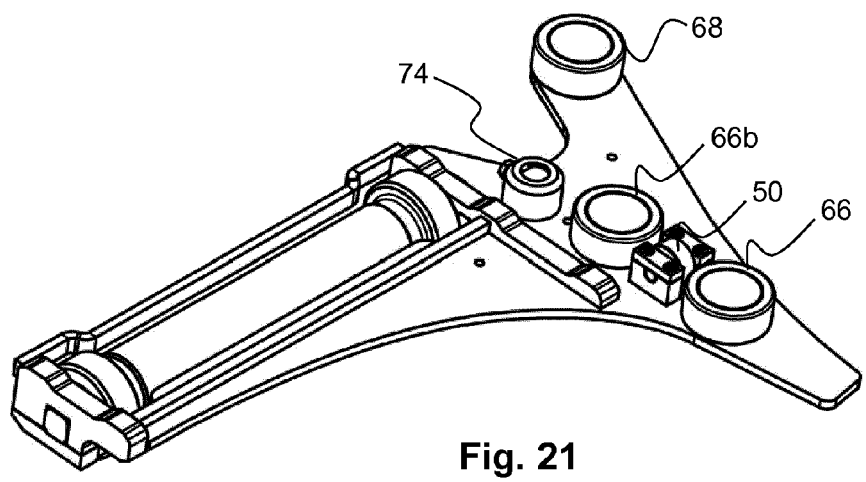

FIG. 21 shows a perspective view of another embodiment of a driver.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
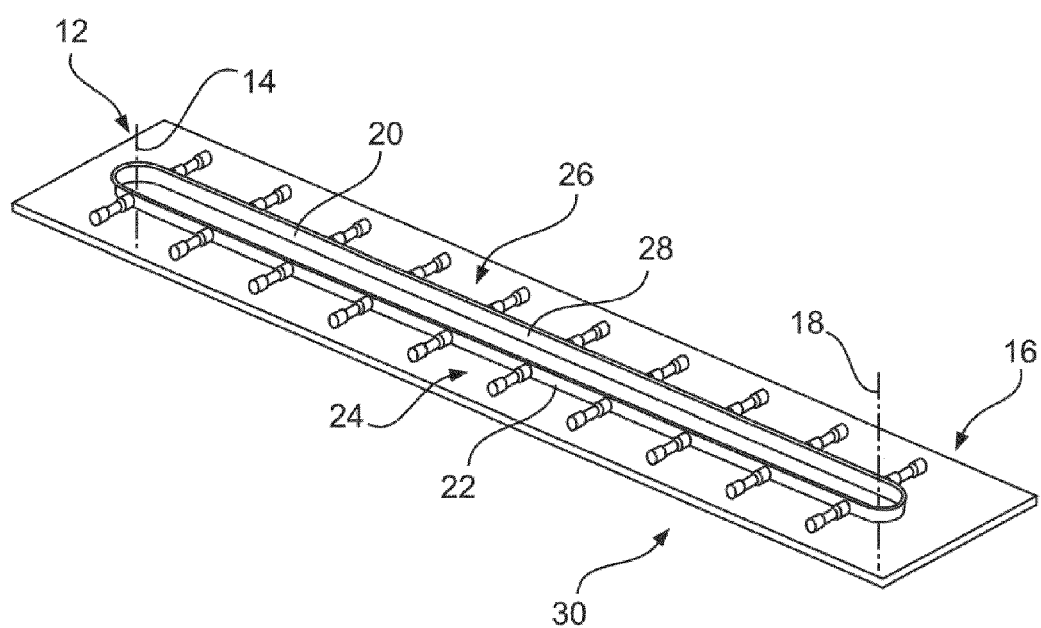
Figure 2:
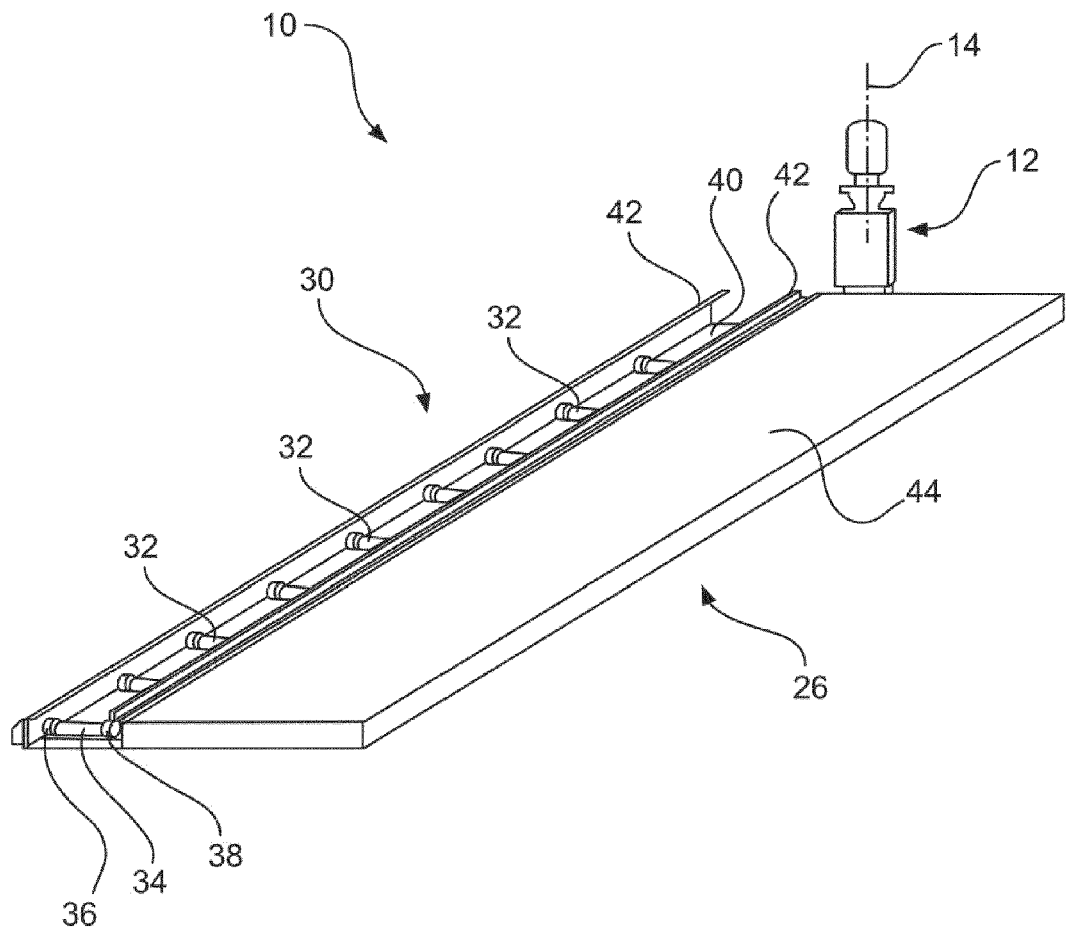

FIG. 1 shows a towing device 10 for motor vehicles in a washing plant comprising a first deflecting device 12 including a first axis of rotation 14 and a second deflecting device 16 including a second axis of rotation 18. Between the first deflecting device 12 and the second deflection device 16 a chain conveyor 20 including a chain forward strand 22 along a load strand 24 of the conveyor chain 20 and a chain return strand 26 along an empty strand 28 of the conveyor chain 20 is shown. Along a portion of the chain forward strand 22 and the load strand 24 a conveying path 30 is arranged along which a motor vehicle can be towed through a washing plant. For towing a motor vehicle the towing device 10 comprises drivers 32 (FIG. 2) which are arranged at regular intervals on the conveyor chain (not shown) and are adapted to tow a motor vehicle along the conveying path 30. For contacting a motor vehicle tire the drivers 32 comprise a driver roller 34 which is disposed between a first track roller 36 and second track roller 38. The drivers 32 roll on a trough-shaped track 40. The trough-shaped track 40 of the conveying path 30 comprises on the inner side and on the outer side, respectively, a rim protector 42 in order to prevent scratching or damage of a rim of a motor vehicle tire. The chain return strand 26 and the conveyor chain 20 are covered by means of a cover 44 and thus protected from contamination.

Figure 3:
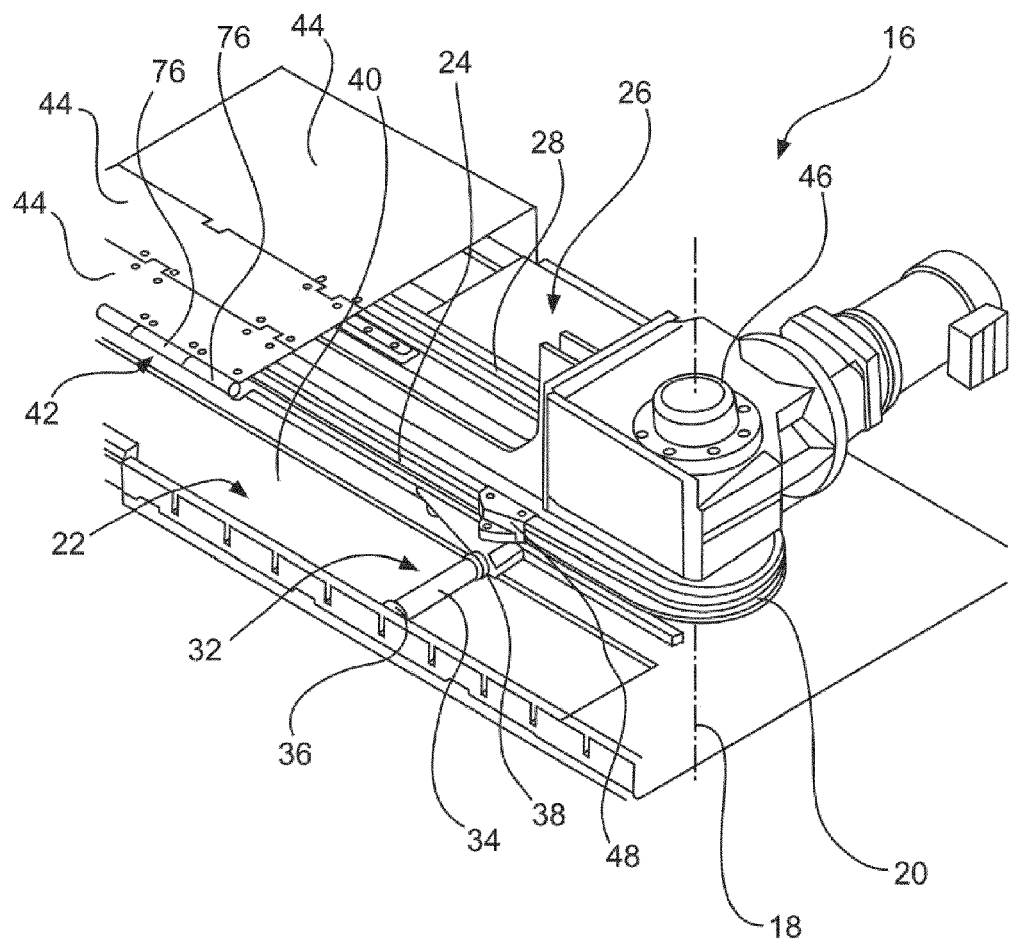
Figure 4:
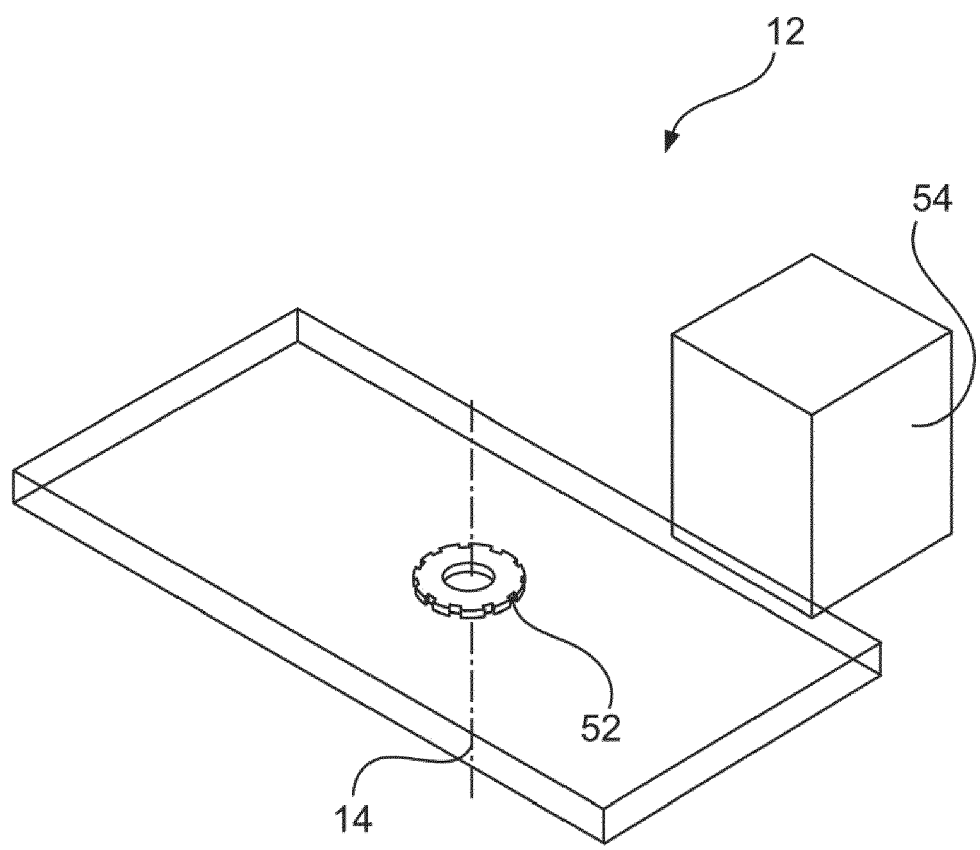

FIG. 3 shows the second deflecting device 16 of the towing device 10 in the form of a drive station including an electrical drive 46. The driver 32 is arranged on a chain joint 48 of the conveyor chain 20 so that the driver can be engaged by the horizontally revolving conveyor chain 20 along the chain forward strand 22 and can be pivoted horizontally about the second axis of rotation 18 from the chain forward strand 22 to the chain return strand 26. The horizontal pivotal movement of the driver 32 is enabled by arranging the load strand and the empty strand 24 and 28 of the conveyor chain 20 in the same horizontal plane. The driver 32 runs along the chain forward strand 22 on a trough-shaped track 40 by means of the first and the second track roller 36, 38 which are arranged on both sides of the roller 34. The towing device 10 is at least partially covered by covers 44, wherein said chain return strand 26 is covered in its entire width by the cover 44, and wherein the chain forward strand 22 along the conveying path 30 at the inner side comprises a cover which substantially covers the conveyor chain 20, wherein at the outer side of the cover facing the track 40 a rim protector 42 is disposed. Herein, the rim protector 42 has the form of protective rollers 76 which are arranged parallel to the track 40 and to the conveyor chain 20. The second deflecting device 16 having the form of a deflecting station including a hydraulic chain tensioner is shown in FIG. 4. The first deflecting device 12 comprises the first axis of rotation 14 about which a deflection sprocket 52 is mounted rotatably in order to transfer the conveyor chain (not shown) from the chain return strand into the chain forward strand. The deflecting device 12 also includes a hydraulic unit 54 for supplying a required hydraulic pressure to the chain tensioner (not shown).

Figure 5:
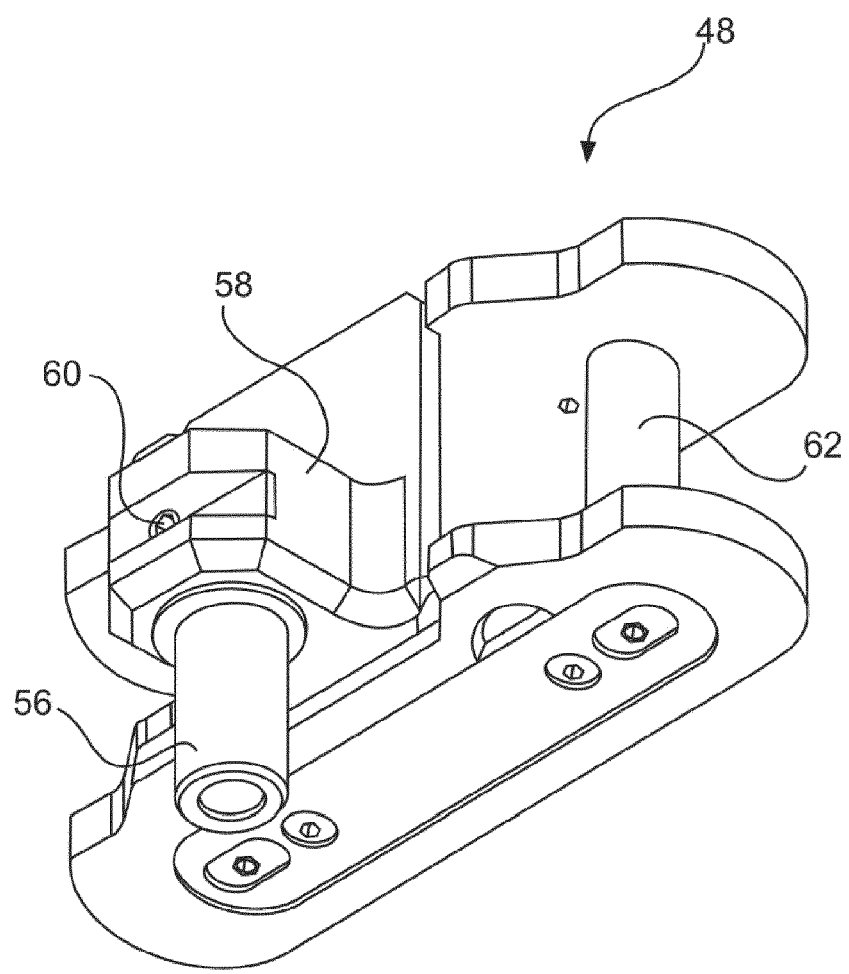

FIG. 5 shows a chain joint 48 which at the outer side comprises a bolt 56 for securing a driver (not shown). The bolt 56 is accommodated in a projection 58, wherein the bolt 56 is detachably mounted in the projection 58 and is secured by a lock screw 60 against unintentional detaching. By means of a rivet 62 the chain joint 48 can be connected with chain links of the conveyor chain 20.

Figure 6:
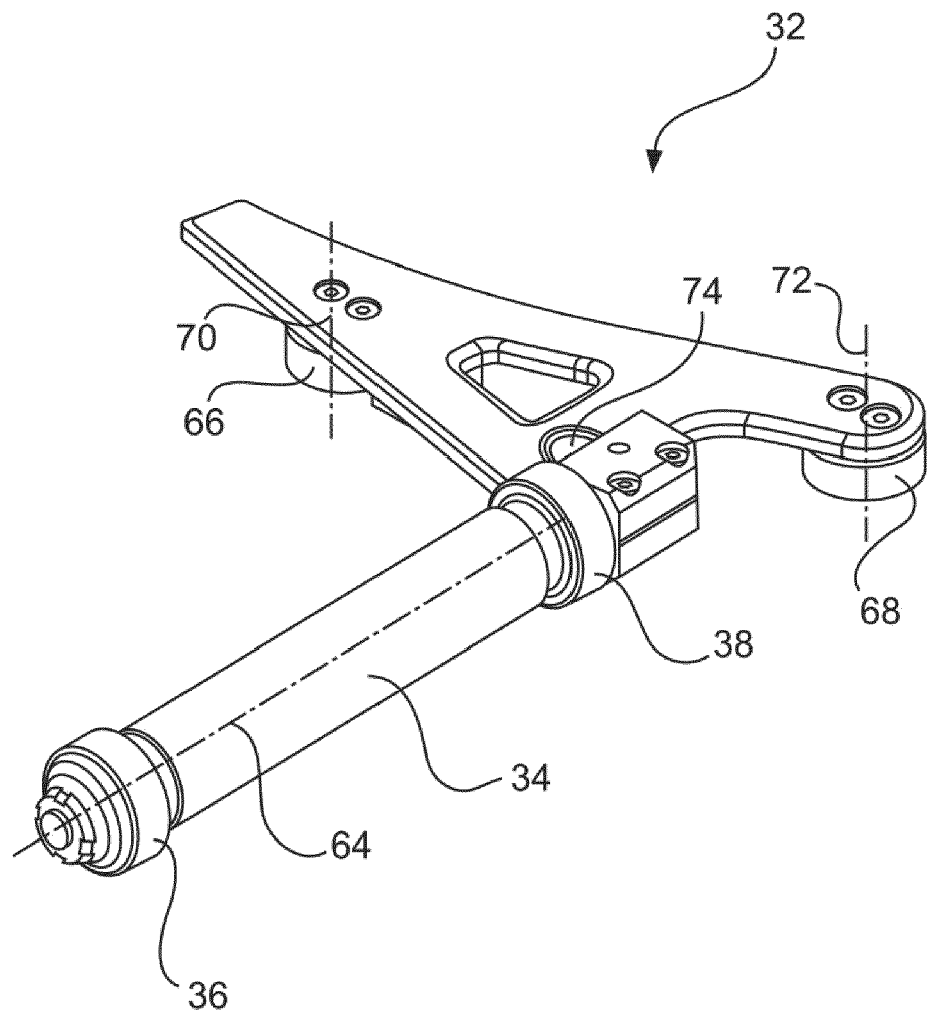

FIG. 6 shows a driver 32 comprising a driver roller 34 for engaging a motor vehicle tire. The driver roller 34 is mounted rotatably about a driver axis 64. At the ends of the driver roller 34 a first track roller 36 and second track roller 38 are disposed, wherein the first track roller 36 is disposed at the outer side and the second track roller 38 is disposed at the inner side. The first and the second track roller 36, 38 and the driver roller 34 are rotatably mounted about the driver axis 64 independently of each other. For guidance the driver comprises a first guide roller 66 and a second guide roller 68. The guide roller axes 70, 72 are disposed substantially perpendicular to the driver axis 64. The first guide roller 66 including the first guide roller axis 70 is disposed behind the driver axis 64 in the conveying direction of the conveyor chain (not shown), and the second guide roller 68 including the second guide roller axis 72 is disposed in front of the driver axis 64 in the conveying direction. Herein, the first guide roller 66 is disposed at the outer side of a guide track (not shown) and the second guide roller 68 is disposed at the inner side the guide track. For attaching the driver 32 at a chain joint 48 the driver comprises of a bore 74 into which a bolt of a chain joint can be inserted.

Figure 7:
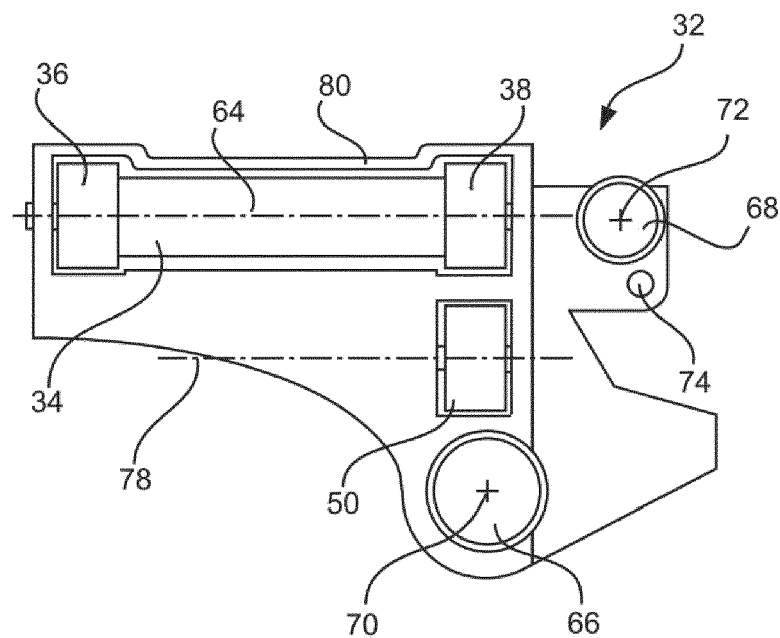
Figure 8:
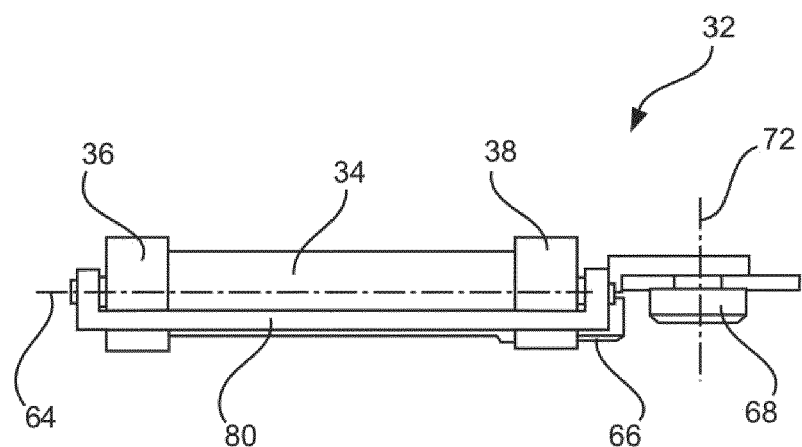
Figure 9:
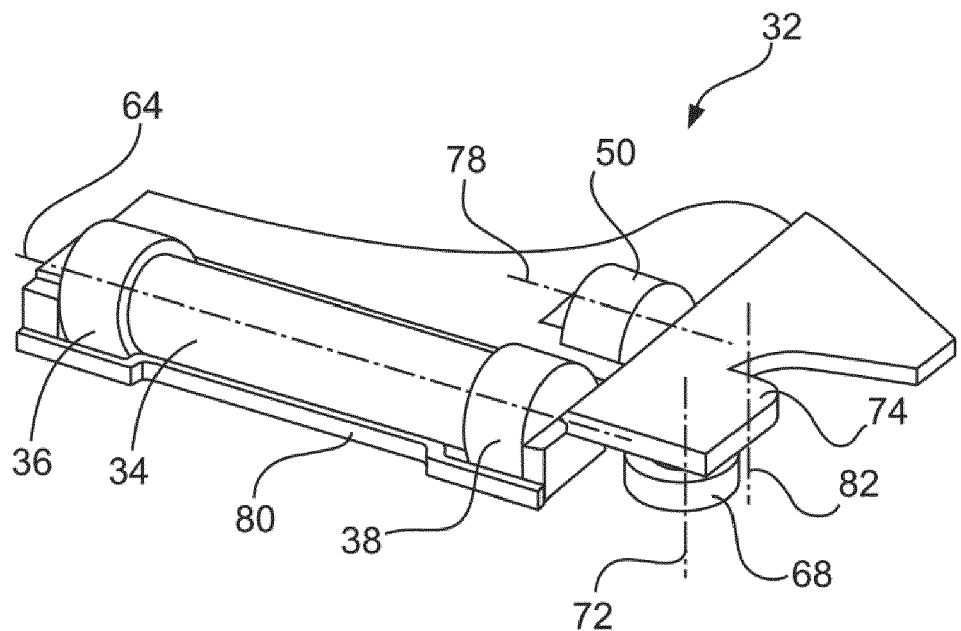
Figure 10:
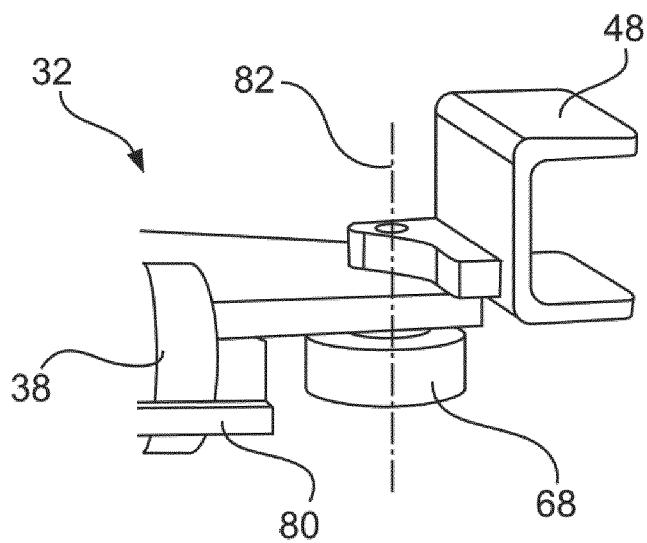

FIG. 7 shows a driver 32 with a support roller 76, wherein the support roller 50 is rotatably mounted about a support roller axis 78. Herein, the support roller axis 78 is arranged parallel to and in the conveying direction behind the driver axis 64, wherein the support roller 50 is arranged behind the second track roller 38 in the conveying direction. The second guide roller 68 is arranged behind the driver axis 64 in the conveying direction of the conveyor chain (not shown). The first guide roller 66 is arranged behind the support roller axis 78 and the support roller 50 in the conveying direction. For attaching the driver 32 at a chain link (not shown) the driver 32 comprises a bore 74. For protecting the driver roller 32 the driver 32 comprises a guard bracket 80 in front of the roller 34 in the conveying direction which guard bracket substantially extends parallel to driver axis 64 along the first track roller 36, the driver roller 34 and second track roller 38. The guard bracket 80 (FIG. 8) is arranged transversely to the conveying direction of the driver 32 below the driver axis 64 at the side of the track or the floor. The second guide roller 68 including the second guide roller axis 72 arranged at the inner side of a conveying track (not shown) is arranged at the inner side of the first guide roller 66. The second guide roller 68 has a smaller diameter than the first guide roller 66, and the second guide roller 68 has a smaller height compared to the first guide roller 66. The second guide roller 68 has a flatter configuration than the first guide roller 66 and one end face thereof is spaced further apart from the floor than the first guide roller 66. The bore 74 (FIG. 9) is arranged adjacent to and behind the second guide roller 68 in the conveying direction. By means of the support roller 50 arranged axis-parallel to the first track roller 36 and the second track roller 38 and arranged behind the second track roller 38 in the conveying direction, the driver 32 can be supported against tilting moments about the driver axis 64. Thus, an unintended contact of the driver 32 with the floor can be prevented, whereby wear of the driver 32 can be reduced. The driver 32 disposed at the chain joint 48 (FIG. 10) is pivotally mounted about the bore axis 82.

FIG. 11 shows an end view of the second deflecting device 16, such as at the exit side of the conveying path 30. The second deflecting device 16 comprises the second axis of rotation 18 and a drive unit 46 by means of which the conveyor chain 20 can be moved, such that motor vehicles, in particular motor vehicle tires 84, can be driven by means of drivers 32 along the conveying path 30, wherein the motor vehicle tires 84 can roll on the track 40. The drivers 32 are pivotably connected to the conveyor chain 20 by the chain joint 48. The drivers 32 are guided by the first guide roller 66 and the second guide roller 68, which contact a guide track 86. The first guide roller 66 contacts the guide track 86 at the outer side, and the second guide roller 68 contacts the guide track at the inner side. In the area of the second deflecting device 16 the guide track 86 has a profile 88 in form of a step, wherein in a range of, for example, substantially 180° about the second axis of rotation 18 the height of the guide track 86 is reduced. As a result, in the area of the profile 88 the second guide roller 68 cannot support the driver 32 against a tilting motion about the bore axis 82 opposite to the conveying direction, such that the second guide roller 68 can intersect the guide track 86, so that the driver 32 can pivot opposite to the conveying direction and can be disengaged from the motor vehicle tire 84. This allows the driver 32 to be pivoted with zero load from the conveying path 30 to the chain return strand 26. At the inner side the driver 32 contacts a driver plate 90 in the area of the second deflecting device 16, wherein the driver plate prevents a tilting motion of the driver 32 in the vertical direction, whereby a pivoting motion of the driver 32 without any contact to the floor from the chain forward strand 22 to the chain return strand 26 is enabled. The chain return strand 26 comprises two tracks 92 for guiding the drivers 32.

The second deflecting device 16 of the towing device 10 shown in FIG. 12 is at least partially covered by a cover 44. At the cover 44 at the side of the conveying path 30 a rim protector 42 is disposed, which extends beyond the conveyor chain up to the edge of the track 40. The track 40 has an edge on the outer side, which also comprises an inwardly directed rim protector 42 and protrudes beyond the outer side of the driver 32. The driver 32 is guided at the guide track 68 which has a profile 88 in the form of a step. The motor vehicle tire 84 (FIG. 13) is carried by the driver 32 along the conveying path 30, wherein the driver 32 is supported by the guide rollers 66, 68 at the guide track 86 against a horizontal tilting motion opposite to the conveying direction. At the step-shaped profile 88 of the guide track 86 the second guide roller 68, which at the inner side abuts at the guide track 86, can no longer contact the guide track 86, such that a horizontal pivoting motion opposite to the conveying direction of the drive 32 is enabled.

FIG. 14 shows a motor vehicle tire 84 at the end of the conveying path 30, wherein the second guide roller 68 with a further transport of the driver 32 by the conveyor chain 20 has no longer contact and traverses the guide track 86 enabling a pivoting motion of the driver supported only by the first guide roll 66, which driver at the outer side abuts the guide track 86. Herein, the guide track 86 for pivoting the driver 32 is no longer disposed on the outer side of the conveyor chain 20, but inwardly, traversing the conveyor chain 20.

A driver 32 towing a motor vehicle tire 84 is shown at the end of the conveying path 30 (FIG. 15A), wherein the second guide roller 68 is arranged without contact with the guide track 86 and traverses it in the conveying direction. The guide track 86 is arranged at the outer side along the conveying path 30 parallel to the conveyor chain 20 and in the region of the chain return strand 26 the guide track 86 is also arranged on the outer side and parallel to the conveyor chain 20. In the area of the second deflecting device 16, the guide track 86 jumps back inwardly and traverses the conveyor chain 20 and is guided at the inner side of the conveyor chain 20 to the chain return strand 26, wherein in an initial region of the chain return strand 26 the guide track 86 traverses the conveyor chain 20 from the inner to the outer side and is guided further at the outer side parallel to the conveyor chain 20. By means of the profile 88 in the form of a step while reducing the height of the guide track 86 in the area of the second deflecting device 16 the driver 32 is guided by the horizontal pivoting motion about the bore axis 82 and the first guide roller 66 rolling at the outer side on the guide track 86. This enables a horizontal pivoting motion of the driver 32 about the bore axis 82 (FIGS. 15b-f) opposite to the conveying direction. This allows the driver 32 to pass the turning point in the second deflecting device 16 with zero load. By means of the end of the profile 88 of the guide track 86 at the beginning of the chain return strand 26 a guidance of the driver 32 is provided by the first guide roller 66 rolling at the outer side on the guide track 86, the second guide roller 68 rolling again at the inner side on the guide track 86 and the chain joint 48. In the chain return strand 26 the first and the second track roller 36, 38 and the support roller 50 are respectively guided on tracks 92.

FIG. 16 shows a component of a modularly constructed conveying path 30. The track 40 comprises on the outer side a collar, at which a rim protector 48 in the form of protective rollers 76 is disposed. On the inner side the conveying path 30 comprises a portion of the guide track 86. The chain return strand 26 (FIG. 17) comprises at the outer side and at the inner side, respectively, a track 92 for the track and support rollers (not shown) of the driver. In addition, at the inner side a portion of the guide track 86 is arranged. The towing device 10 can at least partially (FIG. 18, FIG. 19) be covered by covers 44. Here, the covers 44 may comprise hinges 94, such that the covers 44, in particular the cover 44 of the conveying path 30 and the chain return strand 26 are constructed foldable in order to allow an improved access for maintenance and/or repair purposes. The cover 44 in FIG. 19 is arranged hingedly at the inner side of the track 30 and comprises a rim protector 42 which is constructed in the form of adjacent and coaxially arranged protective rollers 76. The protective rollers 76 are arranged coaxially with respect to the roll axis 79 and have an elongate extension, such that a contact with a rim of a motor vehicle tire by means of co-rotation contributes to prevent damage to the rim.

FIG. 20 shows a driver, which for guiding the driver in addition to a first guide roller 66 and a second guide roller 68 comprises a further guide roller 66b. The guide rollers 66 and 66b are disposed behind the driver axis in the conveying direction of the conveyor chain (not shown), wherein the guide roller 68 is disposed in front of the driver axis in the conveying direction. Here, the guide rollers 66 and 66b are disposed at the outer side of a guide track (not shown) and the guide roller 68 is disposed at the inner side of the guide track. For attachment of the driver to a chain joint, the driver comprises a bore 74 into which a bolt of a chain joint can be inserted. Furthermore, the driver includes a support roller 50 which is disposed between the guide rollers 66 and 66b.

FIG. 21 shows a perspective view of the embodiment of a driver shown in FIG. 20, which for guiding the driver in addition to a first guide roller 66 and a second guide roller 68 comprises a further guide roller 66b. The guide rollers 66 and 66b are disposed behind the driver axis in the conveying direction of the conveyor chain (not shown), wherein the guide roller 68 is disposed in front of the driver axis in the conveying direction. The guide rollers 66 and 66b are disposed at the outer side of a guide track (not shown) and the guide roller 68 is disposed at the inner side of the guide track. For attachment of the driver to a chain joint the driver comprises a bore 74 into which a bolt of a chain joint can be inserted. Moreover, the driver includes a support roller 50 which is disposed between the guide rollers 66 and 66b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A towing device for motor vehicles comprising:
 a conveyor chain revolving between a first deflecting device including a first axis of rotation and a second deflecting device including a second axis of rotation, wherein the conveyor chain comprises a chain forward strand along a load strand and a chain return strand along an empty strand;

a conveying path for motor vehicles at least partially disposed along the load strand, the conveying path comprising a rim protector that is configured in the form of protective rollers;

at least one driver for a motor vehicle tire, wherein the driver is connected to an associated chain joint disposed at the conveyor chain and serves for towing a motor vehicle along the conveying path; and a circumferential guide track for guiding the at least one driver;

wherein the first and the second axis of rotation are arranged vertically, wherein the load strand and the empty strand of the conveyor chain are arranged in a horizontal plane.

2. The towing device according to claim 1, wherein the guide track comprises a profile formed in the vertical direction.

3. The towing device according to claim 1, wherein the driver comprises at least one support roller.

4. The towing device according to claim 1, wherein the chain joint comprises a bolt for pivotably mounting the driver and the driver comprises a corresponding bore for receiving the bolt.

5. The towing device according to claim 1, wherein the first and/or second deflecting device comprises a driver plate for vertically supporting the driver.

6. The towing device according to claim 1, wherein the first deflecting device comprises a hydraulic chain tensioner.

7. The towing device according to claim 1, wherein the conveying path comprises a track for motor vehicle tires.

8. The towing device according to claim 1, wherein tracks are provided along the chain return strand for the first and the second track rollers and/or a support roller of the driver.

9. A washing plant including at least one towing device according to claim 1.

* * * * *